May 10, 1932.   W. BENNET ET AL   1,858,031
EDGE TRIMMING ATTACHMENT FOR LAWN MOWERS
Filed Dec. 14, 1929

INVENTORS
WILLIAM BENNET
ALEC. FARRAR
PETER MACKINNON
BY Fetherstonhaugh & Co
ATTORNEYS Patented May 10, 1932

1,858,031

UNITED STATES PATENT OFFICE

WILLIAM BENNET AND ALEC FARRAR, OF CHRISTCHURCH, AND PETER MacKINNON, OF SIDNEY QUAY, KAIAPOI, NEW ZEALAND

EDGE TRIMMING ATTACHMENT FOR LAWN MOWERS

Application filed December 14, 1929, Serial No. 414,120, and in New Zealand January 19, 1929.

This invention relates to the operation of trimming grass along the edges of lawns, the object of the present invention being to provide an attachment to lawn-mowers whereby this work may be simply and quickly performed.

Figure 1:
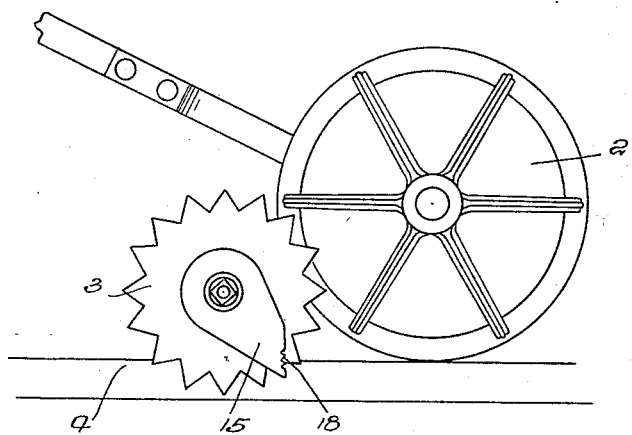
Figure 2:
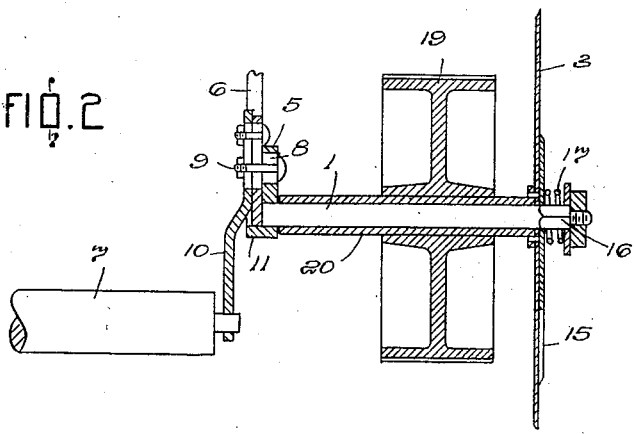
Figure 3:
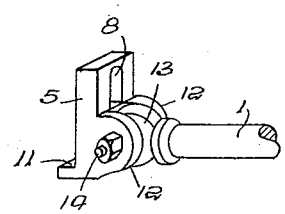

In order that the nature of the invention and its construction may be clearly understood, it will now be fully described and explained with reference to the accompanying sheet of drawings in which:

Fig. 1 is an end-view of a lawn-mower fitted with the invention,

Fig. 2 is a longitudinal section through the invention and the portion of the lawn-mower to which the same is attached and, Fig. 3 is a perspective view of the end of the axle attachable to the lawn-mower and illustrating a construction whereby the angle of such axle may be varied in an upward and downward direction relative to the lawn-mower in order to adapt the cutter to the requirements of a lawn having a sloping edge.

In carrying the invention into effect there is provided an axle 1 furnished at one end with means for detachably securing it to the frame of a lawn-mower as 2 to cause such axle to project laterally from one side of the mower.

Rotatably mounted upon the said axle 1, near its other or outer end, is a circular cutter 3 adapted to overhang the edge 4 of the lawn, as shown in Fig. 1, such cutter being provided with means whereby it will be rotated and so caused to cut the grass projecting beyond the said edge 4 when the mower is pushed along the surface of such lawn.

In the preferred form of its construction the said frame for attaching the axle 1 to the lawn-mower frame consists of a vertically disposed plate 5 fixed to the said inner end of the axle 1 and adapted for clamping against one of the lateral sides of the mower frame, preferably against the lug or bracket 6 provided upon such frame for mounting the usual small roller as 7, or in the case of some mowers the equivalent small carrying wheels.

In the portion of the plate 5 above the axle 1 is provided a hole or opening 8, preferably slotted to receive a bolt as 9 which projects through the ordinary slot of the lug 6 and through that of the member 10 containing the bearing for the said roller 7 or the equivalent small wheels.

At its lower end the said plate 5 is preferably provided with a returned formation or heel-piece 11 adapted to closely underlie the lower edge of the lug 5 and thus assist in holding such plate in position.

The end of the axle 1 may be secured to the plate permanently in some rigid manner as by riveting or welding it thereto as indicated in Fig. 2.

In cases where it is desired to adjust the angle of such axle in an upward or downward direction in order to adapt the cutter to the requirements of a lawn having a sloping edge however the said connection of plate to axle may consist of a knuckle-joint as shown in Fig. 3 and consisting of a pair of lugs as 12 projecting from one of such parts and between which pair of lugs is received a corresponding lug 13 upon the other part, the two lugs 12 and 13 being transfixed by a clamping bolt as 14 whereby they may be tightly drawn together to maintain the joint rigid when the desired adjustment of the axle has been effected. If desired also the contacting surfaces of the lugs may be suitably serrated to interlock and so provide a more rigid arrangement when the clamping bolt 14 is tightened.

In the preferred form of the construction as here shown also the said circular cutter 3 is formed with its periphery serrated to provide teeth which co-operate with a non-rotating cutter 15 to trim the grass with a shearing action.

The said cutter is fixed upon the outer end of the axle 1 preferably by providing the required portion of the latter with a square 16 or other formation adapted to be non-rotatably received within a corresponding hole formed in the cutter 15, a suitable cushioning spring 17 being preferably provided to cause the cutter 15 to bear with a suitable degree of pressure against the adjacent face of the cutter 3.

In order to hold the grass firmly in position while the cutting is taking place and thus ensure neat and even work the cutting edge of the cutter 15 is preferably formed with serrations as 18.

The means for driving the rotary cutter preferably consists of a wheel or roller 19 having its periphery in contact with the surface of the lawn to be rotated thereby when the mower is in motion, such roller 19 being drivably connected with the cutter 3.

In the preferred form of the construction as here shown this is effected by fixing the cutter 3 and roller 19 upon a common sleeve or boss as 20 which is rotatable upon the axle 1.

In operation when it is desired to trim the edge of the grass the device is attached to the mower by placing the plate 5 against the lug 6 of the mower and securing it by means of the clamping bolt 9.

The mower will then be pushed along the surface of the lawn with cutter 3 closely overhanging the edge thereof in order that as the latter revolves it may trim any grass projecting beyond such edge.

We claim:

1. An edge trimming attachment for a lawn mower comprising an axle provided at one end with a knuckle joint for detachably securing it to the frame of the mower to cause such axle to extend laterally from one side of the mower, the said knuckle joint permitting the angle of said axle being varied in an up and down direction in relation to the mower, a circular cutter rotatably carried upon said axle and means for rotating said cutter when said mower is moved along the surface of a lawn.

2. A combination with a lawn mower of an edge trimming attachment including an axle vertically adjustably secured to the frame of said mower, a rotatable cutter carried by said axle and a roller carried by the axle for engagement with the surface of a lawn to rotate the cutter on motion of the mower.

In testimony whereof we have affixed our signatures.

WILLIAM BENNET.
ALEC FARRAR.
PETER MacKINNON.